(No Model.)
T. A. EDISON.
DEVICE FOR PROTECTING ELECTRIC LIGHT SYSTEMS FROM LIGHTNING.
No. 304,084. Patented Aug. 26, 1884.
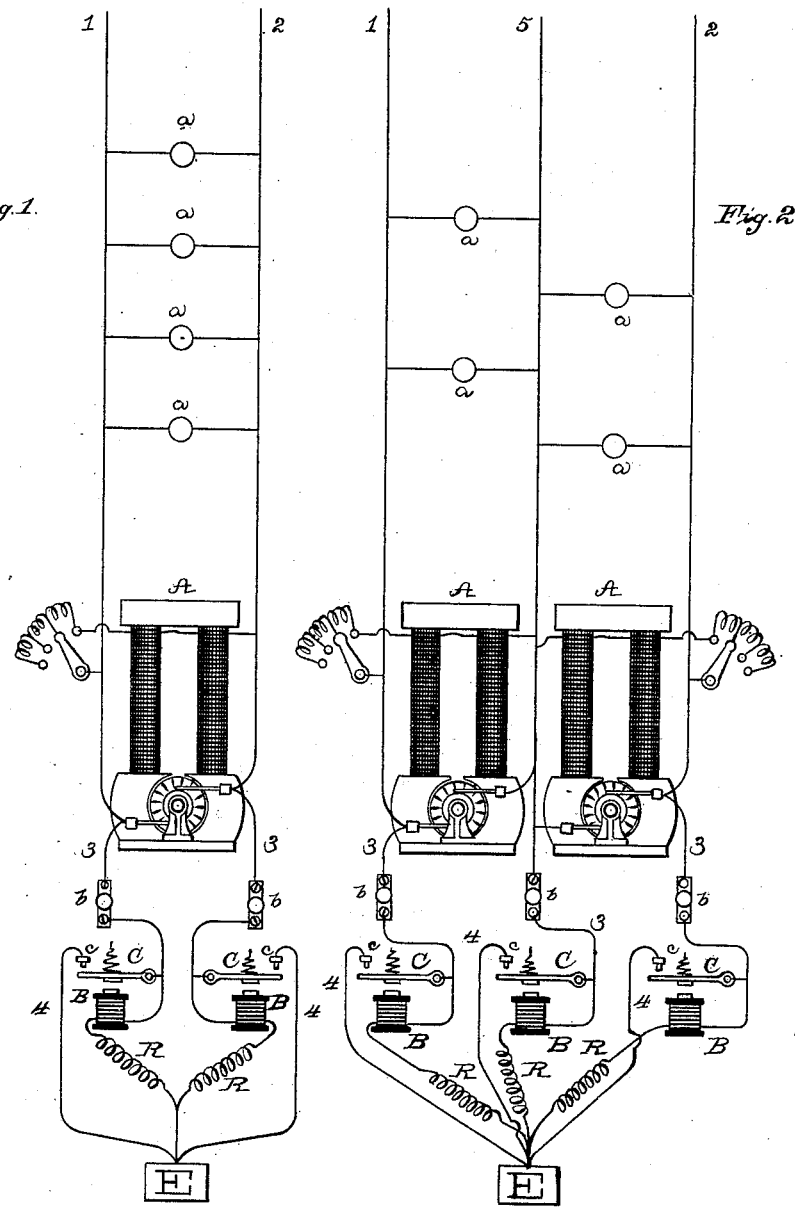
ATTEST:
E. E. Rowland
A. W. Lucey
INVENTOR:
Thomas A. Edison
By Rich'd N. Dyer
Atty.

UNITED STATES PATENT OFFICE.

THOMAS A. EDISON, OF MENLO PARK, NEW JERSEY.

DEVICE FOR PROTECTING ELECTRIC-LIGHT SYSTEMS FROM LIGHTNING.

SPECIFICATION forming part of Letters Patent No. 304,084, dated August 26, 1884.

Application filed October 10, 1883. (No model.)

*To all whom it may concern:*

Be it known that I, THOMAS A. EDISON, of Menlo Park, in the county of Middlesex and State of New Jersey, have invented a new and useful Improvement in Systems of Electrical Distribution, (Case No. 590,) of which the following is a specification.

The object of this invention is to protect electrical generators and the translating devices connected therewith from being injured by lightning conveyed to them by the metallic conductors which extend from them.

In my application No. 589 (Serial No. 108,559) is shown an arrangement for this purpose, consisting of connections of high resistance extending from the two or more metallic conductors leading from the generator or generators to the earth, which connections do not materially detract from the current passing to the translating devices of the system, but act to convey the discharges to the earth if either of the metallic conductors should be struck by lightning. The especial object I now have in view is to allow the closed ground-circuits to be of very high resistance without impairing the degree of protection afforded. To accomplish this, I provide ground-conductors of very high resistance and devices included in such conductors, which, on the passage of an abnormal current, such as a lightning-discharge, cause the closing of low-resistance conductors, which convey the lightning to the earth. As in the application above referred to, one set of ground-connections is made from each of the two or more metallic conductors which extend from the source of energy.

My invention is illustrated in the annexed drawings, in which Figure 1 is a diagram illustrating the application of my invention to an ordinary multiple-arc system of electrical distribution, and Fig. 2 a diagram showing it in connection with a compensating or three-wire system.

Referring to Fig. 1, A is a dynamo-electric machine, and 1 2 are main conductors extending therefrom and supplying lamps, motors, or other translating devices *a a*, connected in multiple arc. From each main conductor a ground-wire, 3, extends to earth E, containing a high resistance, R, preferably of a metal having a low fusing-point. Each conductor 3 is closed by means of a plug, *b*, and these plugs are inserted upon the approach of a thunder-storm. Each conductor 3 also includes the coils of an electro-magnet, B. Each magnet is provided with a pivoted spring-retracted armature, C, which is attracted by the magnet away from a contact-point, *c*. Each armature C forms part of the low-resistance ground-connection 4. When the circuits are closed at *b*, the magnets B attract their armatures, breaking circuits at *c c*. Being of high resistance the ground-circuit 3 3 takes very little current from the system. Such circuit may, however, be arranged to convey small quantities of lightning to the earth. If, however, an abnormal current due to an excessive lightning-discharge upon either of the main conductors 1 2 reaches a conductor 3, such conductor is fused by it, the armature C is retracted by its spring, connection is made at *c*, and the lightning passes to the earth through the low-resistance conductor 4. It is necessary, as explained in the application referred to, to have the ground-connection from both main conductors, in order that whichever conductor may be struck the lightning may pass to earth without crossing through the lamp-circuits or armature-circuit.

In Fig. 2, in addition to the main conductors 1 and 2, the compensating-conductor 5 extends from between the generators A A, the translating devices *a a* being connected between said compensating-conductor and the main conductors. Each of the three metallic conductors 1, 2, and 5 is therefore provided with the ground-connections 3 4, and the accompanying circuit-controlling devices, as described with reference to Fig. 1. While it is preferred to place these devices at the central station or source of supply, it is evident that they might be arranged at any part of the system.

What I claim is—

1. The combination, with an electrical generator and the external circuit therefrom, of two conductors extending from each side of said circuit to the earth, and means controlled by the current in one of the earth-circuits thus formed for controlling the other earth-circuit, substantially as set forth.

2. The combination, with an electrical generator and the external circuit therefrom, of a high-resistance conductor and a low-resistance conductor extending from each side of the circuit to the earth, whereby two earth-circuits are formed, and means controlled by the current in the high-resistance earth-circuit for controlling the low-resistance earth-circuit, substantially as set forth.

3. The combination, with an electrical generator and the external circuit therefrom, of a high-resistance and a low-resistance ground-connection from each side of said circuit to the earth, whereby two earth-circuits are formed, and means actuated by an excess of current in the high-resistance earth-circuit for closing the low-resistance one, substantially as set forth.

4. The combination, with the fusible high-resistance conductor connected as described, of an electro-magnet therein, and a circuit-closer controlled by said magnet, and acting, upon a cessation of current in the magnet-circuit, to close circuit through a similarly-connected low-resistance conductor, substantially as set forth.

This specification signed and witnessed this 27th day of July, 1883.

THOS. A. EDISON.

Witnesses:
H. W. SEELY,
EDWARD H. PYATT.